US012650182B2

US012650182B2

(12) United States Patent
Hall et al.

(10) Patent No.: US 12,650,182 B2
(45) Date of Patent: Jun. 9, 2026

(54) CONDUIT GUIDE FOR CONDUIT LAYING MACHINE

(71) Applicant: ROBERTS WELDING & FABRICATING LTD., Woodstock (CA)

(72) Inventors: Robert W. H. Hall, Embro (CA); David C. Princz, Paris (CA); Benjamin G. McKay, Cambridge (CA)

(73) Assignee: ROBERTS WELDING & FABRICATING LTD., Woodstock (CA)

( * ) Notice: Subject to any disclaimer, the term of this patent is extended or adjusted under 35 U.S.C. 154(b) by 427 days.

(21) Appl. No.: 18/489,975

(22) Filed: Oct. 19, 2023

(65) Prior Publication Data

US 2024/0167584 A1     May 23, 2024

Related U.S. Application Data

(60) Provisional application No. 63/426,171, filed on Nov. 17, 2022.

(51) Int. Cl.
| | |
|---|---|
| *H02G 1/08* | (2006.01) |
| *E02F 5/10* | (2006.01) |
| *F16L 1/032* | (2006.01) |

(52) U.S. Cl.
CPC .............. *F16L 1/032* (2013.01); *E02F 5/101* (2013.01); *H02G 1/08* (2013.01)

(58) Field of Classification Search
CPC ............ F16L 1/032; E02F 5/101; E02F 5/102
See application file for complete search history.

(56) References Cited

U.S. PATENT DOCUMENTS 8,047,744 B2    11/2011  Hall
2010/0104374 A1*   4/2010  Hall ......................... H02G 1/06
405/184

* cited by examiner

*Primary Examiner* — Jason L Vaughan
*Assistant Examiner* — Amanda Kreiling
(74) *Attorney, Agent, or Firm* — Brunet & Co. Ltd.; Robert Brunet; Hans Koenig (57)                  ABSTRACT

A conduit guide for a conduit laying machine has an arcuate channel and at least two longitudinally spaced apart roller sets rotatably mounted in the channel. Each roller set has an upper bow roller and at least two longitudinally spaced apart lower flat rollers, each roller set having a roller gap between the upper and lower rollers. The arcuate path has a radius that is equal to or greater than a minimum bend radius for the conduit. At least one roller gap adjuster has at least one resilient biasing element that permits increasing the spacings of the roller gaps while biasing the spacings of the roller gaps toward fixed minimum spacings. The guide reduces damage and/or twisting of conduits during a conduit laying operation, especially when laying multiple conduits (e.g., triplex electrical cable) from the same conduit feed passage.

22 Claims, 13 Drawing Sheets

CONDUIT GUIDE FOR CONDUIT LAYING MACHINE

CROSS-REFERENCE TO RELATED APPLICATIONS

This application claims the benefit of U.S. Provisional Patent Application Ser. No. 63/426,171 filed Nov. 17, 2022, the entire contents of which is herein incorporated by reference.

FIELD

This application relates to conduit laying machines (e.g., cable plows), in particular to devices for guiding conduits on conduit laying machines.

BACKGROUND

Conduit laying machines, for example the conduit laying machine described in U.S. Pat. No. 8,047,744 issued Nov. 1, 2011, the entire contents of which is herein incorporated by reference, are used for laying conduits underground. As the conduit laying machine is driven, the machine opens a trench in the ground, lays conduit (e.g., drainage tile, electrical cable, fiber optic cable or the like) in the trench and then covers over the trench. Conduit to be laid is provided on one or more reels that may be mounted on the machine itself or on a different vehicle driven in tandem with the conduit laying machine. During a conduit-laying operation, conduit is drawn off the one or more reels while being laid in the trench. The reels are often mounted at a front of the machine while the trenching and laying operations are performed at a rear of the machine. In such an arrangement, conduit is drawn over a length of the machine and fairleads are employed to support the conduit at one or more positions above the machine as the conduit is drawn off the reels. At the rear of the machine, a conduit guide is employed to guide the conduit downward into a conduit feed passage for laying in the trench.

As the conduit is drawn off the reels, the conduit moves rearward in a generally horizontal orientation until reaching the conduit guide. The conduit guide receives the conduit from the fairleads and guides the moving conduit downward into a generally vertical orientation for feeding into the conduit feed passage. Heretofore, the conduit guide has been constructed as a channel having an arcuate floor, for example a curved pipe, where the conduit simply slides on the floor, which is suitable for many applications. However, when laying multiple conduits through the same conduit feed passage (e.g., triplex electrical cable), there is a need for arranging the conduits in the same configuration from the conduit guide through the conduit feed passage into the trench without permitting the conduits to twist and without bending the conduits beyond a certain bend radius. In current conduit guides, frictional forces between the conduits and the conduit guide, as well as the large amount of conduit movement in the conduit guide, result in a high potential for damage due to over-bending, abrasion and twisting of the conduits as the conduits are guided by the conduit guide.

There remains a need for a conduit guide that reduces the potential for damaging conduits during a conduit laying operation with a conduit laying machine, especially for laying multiple conduits (e.g., triplex electrical cable) from the same conduit feed passage.

SUMMARY

A conduit guide for a conduit laying machine comprises: laterally spaced apart walls defining an arcuate channel through which conduit passes; at least two longitudinally spaced apart roller sets rotatably mounted in the channel, the at least two longitudinally spaced apart roller sets comprising a front roller set and a rear roller set, wherein the front roller set comprises a first upper bow roller and at least two longitudinally spaced apart first lower flat rollers with the first upper bow roller situated between two of the first lower flat rollers, the conduit passing through a first roller gap between the first upper and lower rollers, and the rear roller set comprises a second upper bow roller and at least two longitudinally spaced apart second lower flat rollers with the second upper bow roller situated between two of the second lower flat rollers, the conduit passing through a second roller gap between the second upper and lower rollers; wherein the conduit follows an arcuate path between the first and second roller gaps, the arcuate path having a radius that is equal to or greater than a minimum bend radius for the conduit; at least one roller gap adjuster, the at least one roller gap adjuster operable to adjust spacings of the roller gaps, the at least one roller gap adjuster comprising at least one resilient biasing element that permits increasing the spacings of the roller gaps while biasing the spacings of the roller gaps toward fixed minimum spacings of the roller gaps.

A cable plow comprises a trench former; a conduit feed passage mounted behind the trench former; and, the conduit guide described above.

A conduit laying machine comprises: a vehicle; at least one conduit reel mounted on the vehicle; and, a cable plow mounted on the vehicle, the cable plow comprising the conduit guide described above.

In some embodiments, the at least two longitudinally spaced apart roller sets comprises two longitudinally spaced apart roller sets. In some embodiments, the front roller set is situated vertically higher than the rear roller set in the arcuate channel when the conduit guide is mounted on the conduit laying machine. In some embodiments, each set of rollers comprises three rollers, one upper contoured roller, preferably a bow roller, and two lower flat rollers. The flat rollers are spaced apart longitudinally with the contoured roller situated above and between the flat rollers. The conduit follows an arcuate path between the front roller set and the rear roller set. The radius of the arcuate path is equal to or greater that a minimum cable bend radius in order to avoid kinking the conduit during the laying operation. The shape of the contoured roller is such that when a triplex cable is between the upper contoured roller and the lower flat rollers, the triplex cable assumes a triangular configuration with one cable in a valley of the contoured roller and two cables parallel to each other and beneath the cable in the valley. The cable in the valley of the contoured roller is also preferably situated in a valley formed by and between the two parallel cables. Thus, the contoured roller preferably has a valley between two roller walls, the roller walls having tapered inner surfaces to constrain motion of the two parallel cables while accommodating the triangular configuration.

In some embodiments, the at least one roller gap adjuster comprises at least one moveable bracket connected to one or all of the upper contoured rollers. In some embodiments, the at least one resilient biasing element comprises at least one spring-loaded pin (e.g., spring-loaded bolt) fixedly mounted to at least one of the walls of the conduit guide. In some embodiments, the at least one resilient biasing element is mounted on the at least one moveable bracket under tension to bias the at least one moveable bracket toward the fixed minimum spacings of the roller gaps, preferably while permitting the at least one moveable bracket to move under forces applied by the conduit as the conduit passes through the roller gaps in order to increase the spacing of the roller gap. The at least one roller gap adjuster thus permits dynamic adjustability of each of the roller sets as the conduit applies counter-pressure against the upper contoured rollers. In some embodiments, the at least one resilient biasing element is adjustable to adjust biasing tension of the at least one resilient biasing element. Adjustability of the biasing tension permits the guide to accommodate different cable diameters. In some embodiments, the conduit guide comprises two roller sets and four roller gap adjusters. In some embodiments, one roller gap adjuster is connected to each side of each upper contoured roller.

In some embodiments, the upper contoured rollers are each held in place by a respective pair of spring-loaded pins. The spring-loaded pins are set to maintain tension on the conduit (e.g., triplex cable) while not holding the conduit too solidly so that when the conduit comprises a triplex cable, the individual cables remain in the triangular configuration but are allowed some movement tolerance in order to avoid damage during conduit laying. Cooperation between the upper contoured roller together with the lower flat rollers keep the individual cables from twisting out of the triangular configuration during conduit laying. As such, the conduit guide is suitable for guiding any form of conduit typically used with conduit laying machines, but is particularly useful for laying multiplex conduit, for example triplex electrical cable. Advantageously, the conduit guide requires no feeding assembly as the rollers only guide the triplex electrical cable.

The machine comprises at least one conduit reel, but may comprise any number of conduit reels required to lay the desired number of conduits. For example, for laying triplex electrical cable, at least three conduit reels may be required, one conduit reel for each cable of the triplex electrical cable.

The conduit guide may further comprise one or more additional arcuate channels for guiding one or more additional conduits (e.g., tape, fiber optic cable and the like) into one or more additional conduit feed passages.

The conduit guide described herein reduces the potential for damaging conduits during a conduit laying operation with a conduit laying machine, especially for laying multiple conduits (e.g., triplex electrical cable) from the same conduit feed passage. At the same time, the conduit guide is capable of maintaining multiplex conduit (e.g., triplex cable) in a desired configuration without twisting or entangling of the conduit. Further, the conduit guide is sufficiently adjustable to realize the above benefits for different diameter conduits.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

Figure 1A:
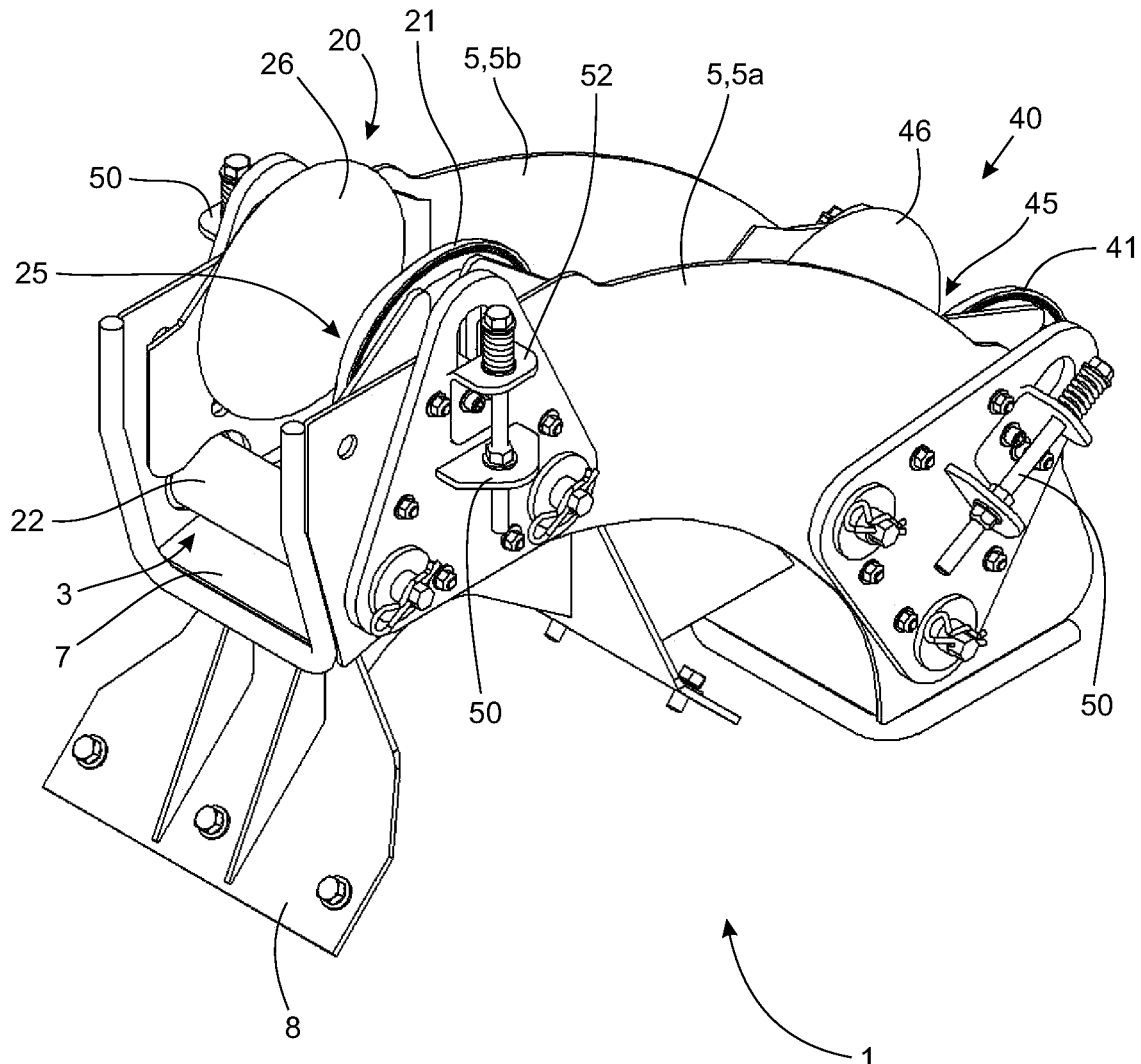
FIG. 1A depicts a first perspective view of a conduit guide in accordance with the present invention.
Figure 1B:
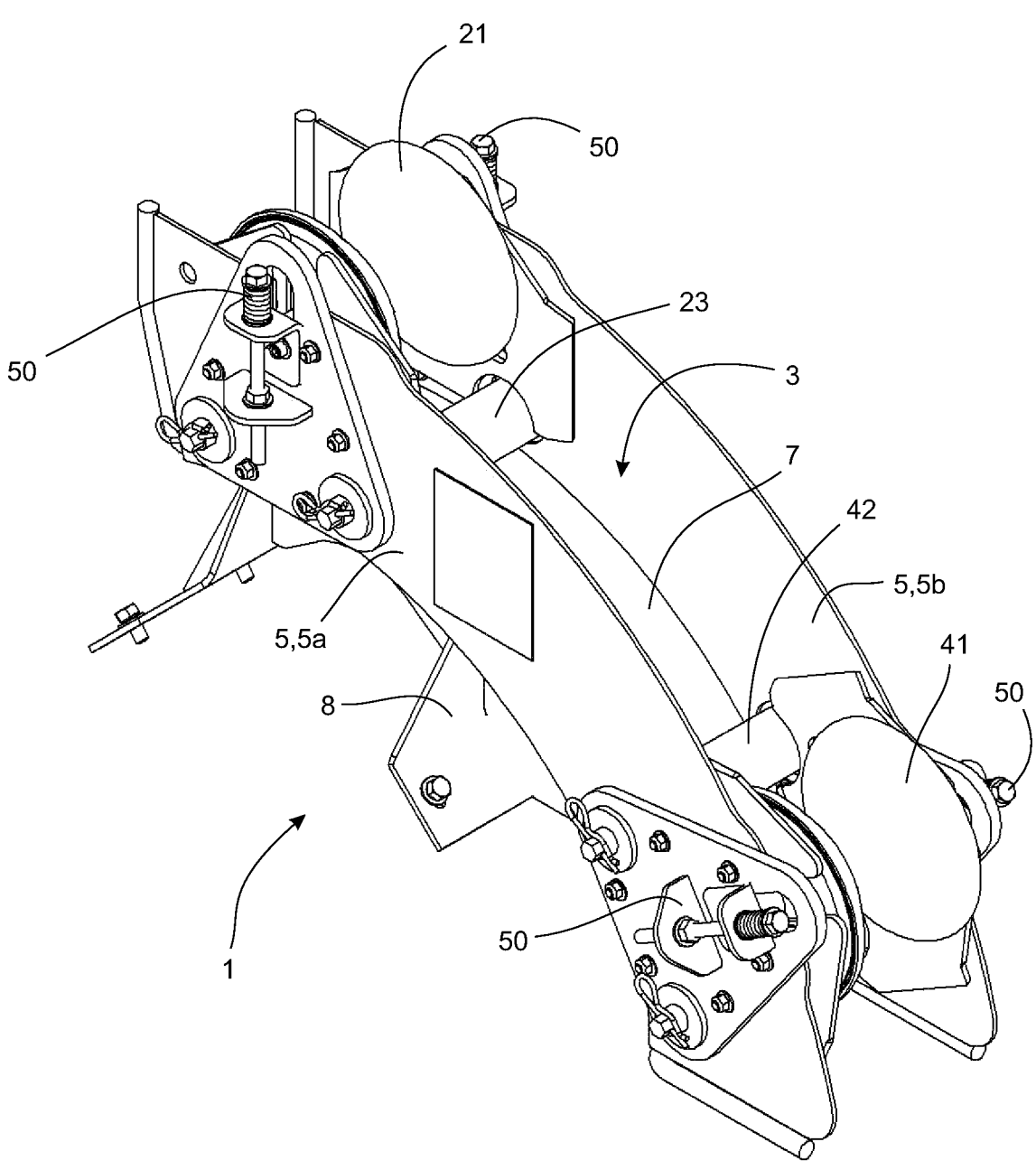
FIG. 1B depicts a second perspective view of the conduit guide of FIG. 1A.
Figure 1C:
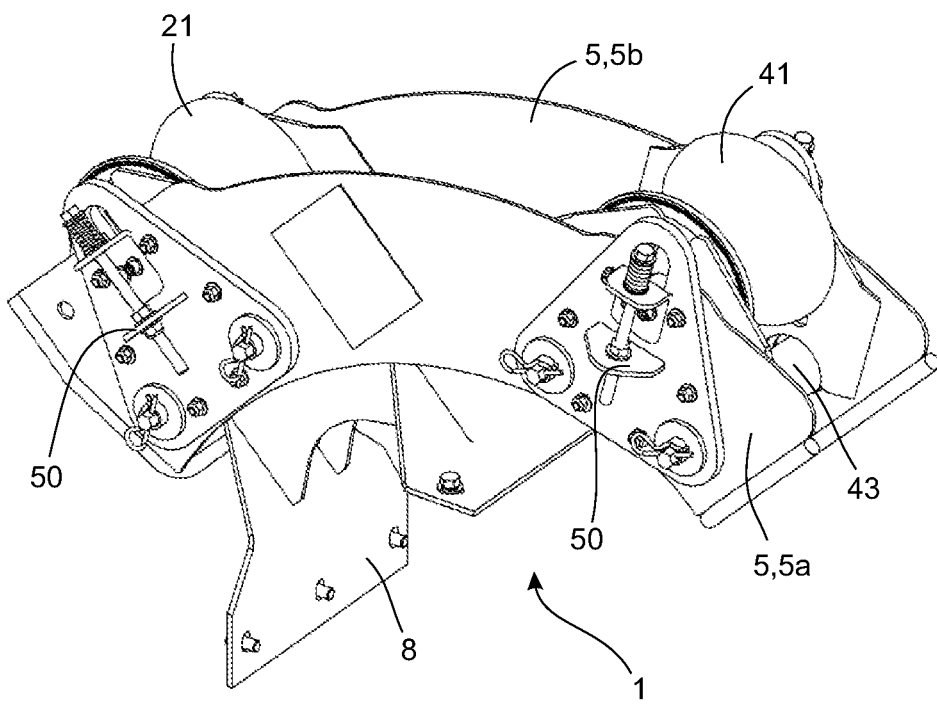
FIG. 1C depicts a third perspective view of the conduit guide of FIG. 1A.
Figure 1D:
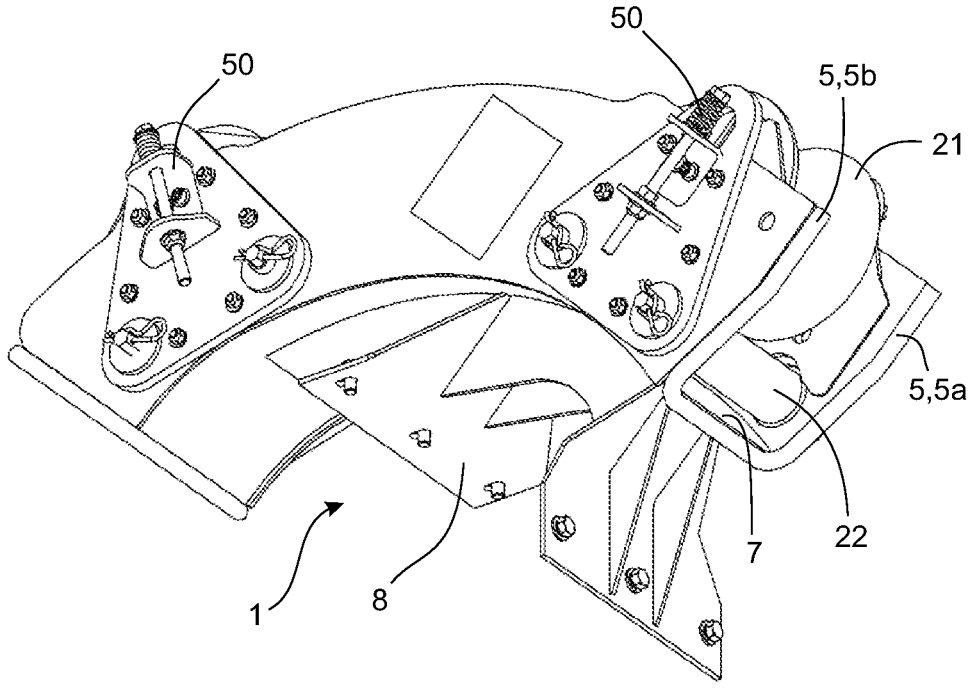
FIG. 1D depicts a fourth perspective view of the conduit guide of FIG. 1A.
Figure 1F:
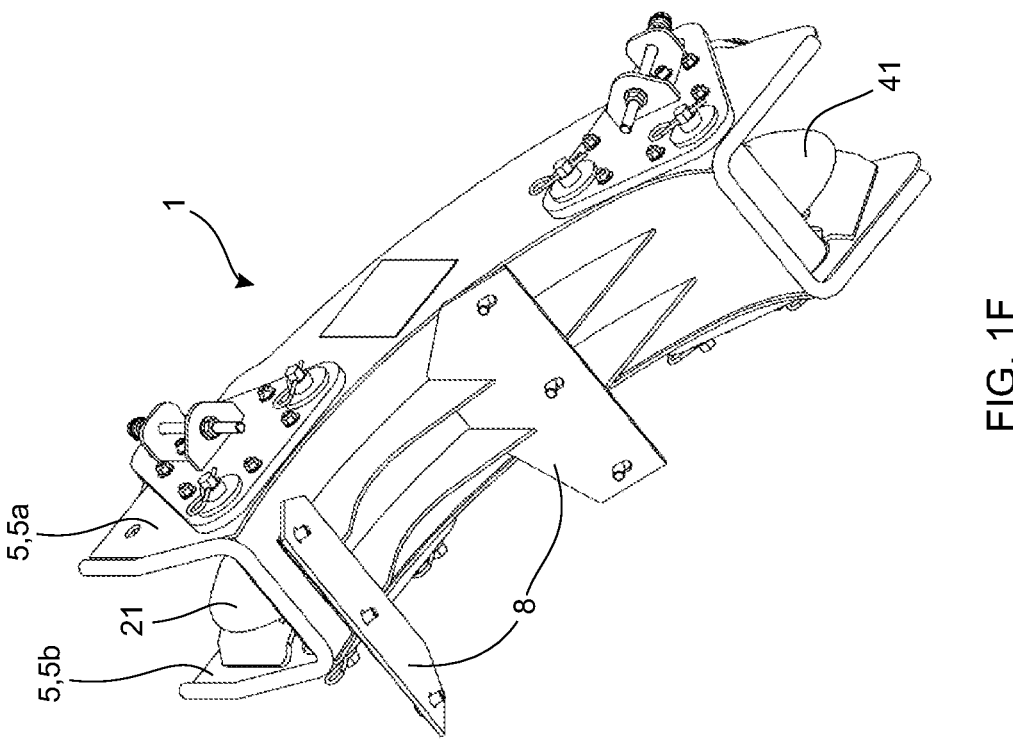
FIG. 1F depicts a sixth perspective view of the conduit guide of FIG. 1A.
Figure 1E:
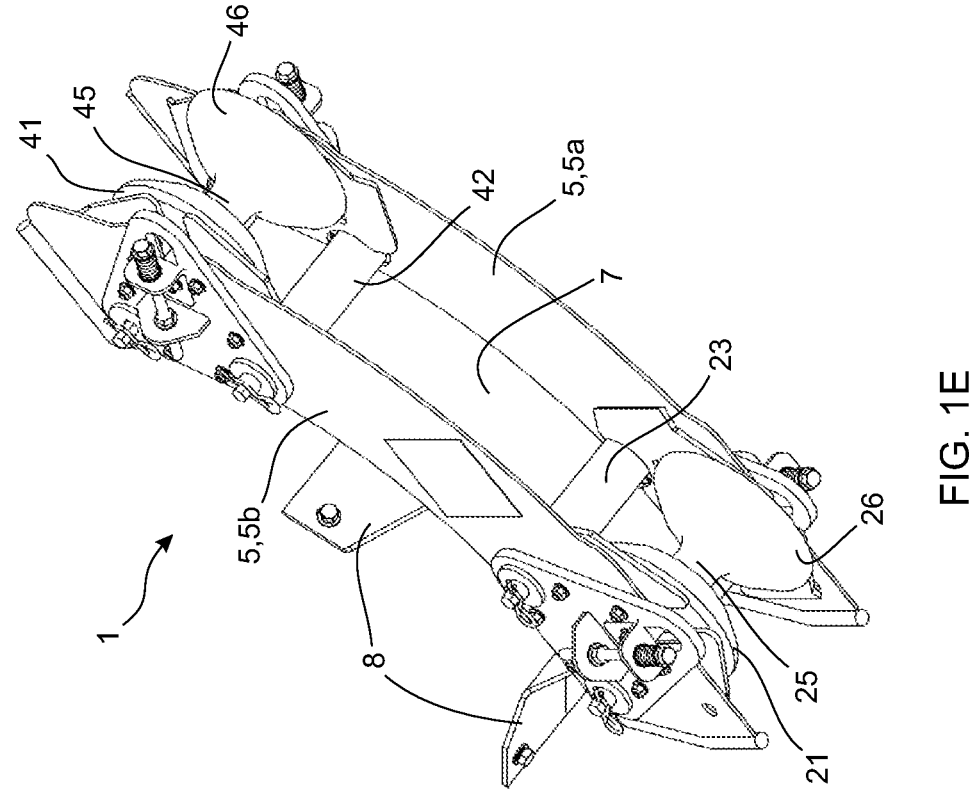
FIG. 1E depicts a fifth perspective view of the conduit guide of FIG. 1A.

The Figures illustrate an embodiment of a conduit guide 1 for a cable plow 100 of a conduit laying machine 200. The conduit guide 1 comprises an arcuate channel 3 defined by two laterally spaced apart arcuate walls 5, individually identified as 5a and 5b, the walls 5a and 5b connected by a floor 7 to form the channel 3. The conduit guide 1 further comprises a guide mount 8 connected to the floor 7 to permit mounting the conduit guide 1 on the cable plow 100. The guide mount can take any form depending on what portion of the cable plow the conduit guide needs to be mounted on, for example a shaker box, a top of a blade, a blade holder, etc. Rotatably mounted within the channel 3 are two roller sets, a front roller set 20 and a rear roller set 40, which are longitudinally spaced apart in the channel 3. When the conduit guide 1 is mounted on the cable plow 100 (see FIG. 6A and FIG. 7), the front roller set 20 is vertically higher than the rear roller set 40 so that conduit 301 entering the conduit guide 1 from the front follows an arcuate conduit path A-A through the channel 3 (see FIG. 2C) to be directed downward into a conduit feed passage 184 of the cable plow 100. The front roller set 20 comprises a front upper contoured roller 21 in the form of a bow roller and two longitudinally spaced-apart front lower flat rollers 22, 23 such that the front upper contoured roller 21 is situated longitudinally between the front lower flat rollers 22, 23. Likewise, the rear roller set 40 comprises a rear upper contoured roller 41 in the form of a bow roller and two longitudinally spaced-apart rear lower flat rollers 42, 43 such that the rear upper contoured roller 41 is situated longitudinally between the rear lower flat rollers 42, 43. The front upper contoured roller 21 and the front lower flat rollers 22, 23 are spaced apart to form a front roller gap 24 through which the conduit 301 enters the conduit guide 1 and the rear upper contoured roller 41 and the rear lower flat rollers 22, 23 are spaced apart to form a rear roller gap 44 through which the conduit 301 exits the conduit guide 1. The front and rear roller gaps 24, 44 are oriented such that the conduit 301 follows the arcuate conduit path A-A through the channel 3, whereby the radius of the arcuate conduit path A-A is equal to or greater than the minimum bend radius of the conduit 301 to avoid kinking the conduit 301. As the conduit 301 passes through the conduit guide 1, the conduit rides on top of the lower flat rollers 22, 23, 42, 43 between the lower flat rollers 22, 23, 42, 43 and the upper contoured rollers 21, 41 such that the conduit 301 engages the upper contoured rollers 21 and 41 in valleys 25 and 45 thereof, respectively. Because the conduit 301 only engages rollers, there is less chance of experiencing abrasion damage as the conduit 301 passes through the conduit guide 1.

Figures 5A, 5B, 5C:
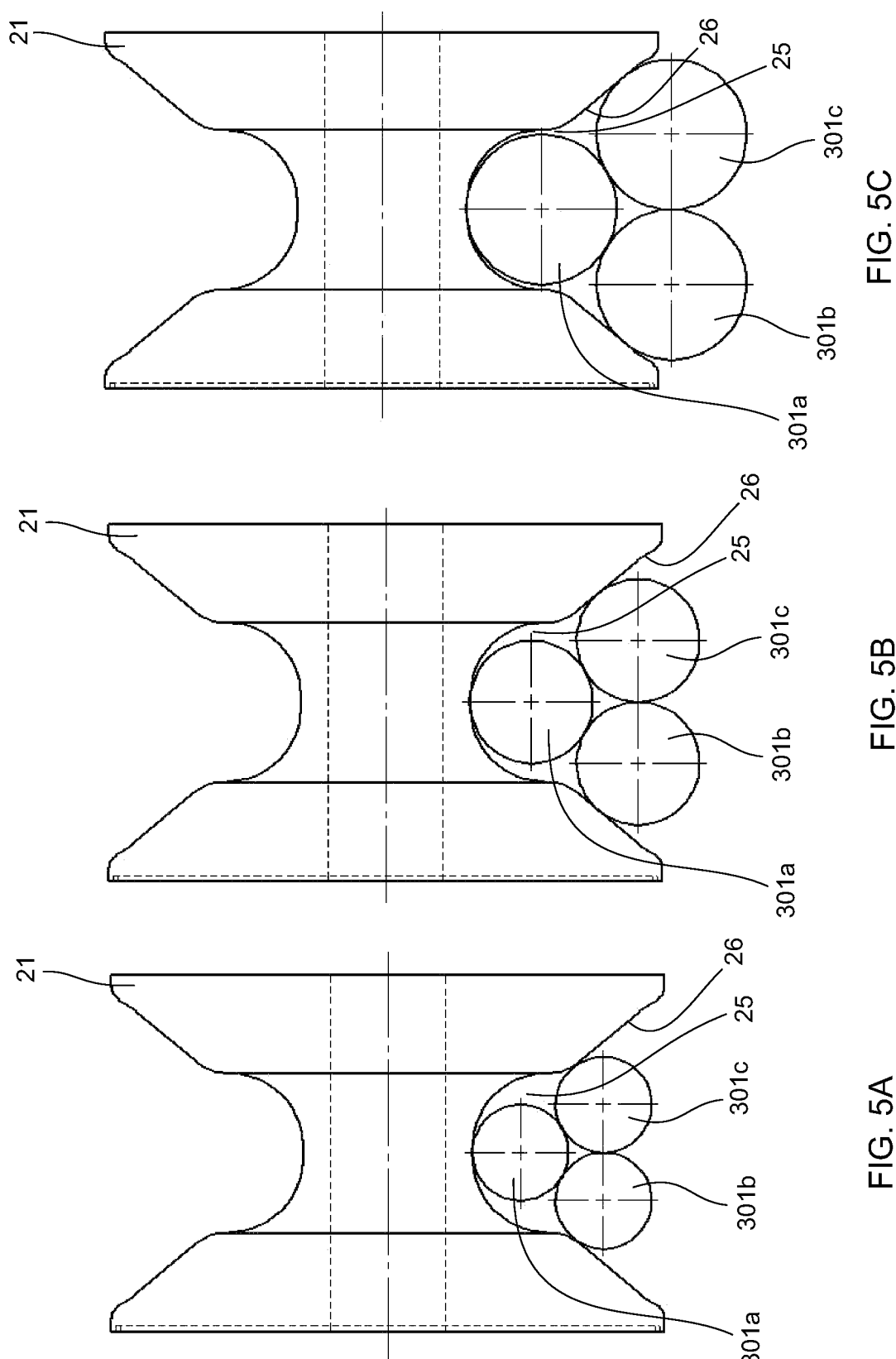
FIG. 5A depicts the configuration of small diameter triplex electrical cable at a contoured roller of the conduit guide of FIG. 1A.
FIG. 5B depicts the configuration of medium diameter triplex electrical cable at a contoured roller of the conduit guide of FIG. 1A.
FIG. 5C depicts the configuration of large diameter triplex electrical cable at a contoured roller of the conduit guide of FIG. 1A.

As the conduit 301 passes longitudinally through the roller gaps 24, 44 between the upper contoured rollers 21, 41 and the lower flat rollers 22, 23, 42, 43, the conduit 301 is in contact with both the upper contoured rollers 21, 41 and the lower flat rollers 22, 23, 42, 43, which constrains lateral motion of and prevents twisting of the conduit 301. Twisting prevention is particularly important when the conduit 301 comprises multiple conduits, for example when the conduit 301 is a triplex electrical cable having three separate cables 301a, 301b and 301c as shown in FIG. 5A, FIG. 5B, FIG. 5C and FIG. 7. Prevention of twisting prevents the separate cables 301a, 301b and 301c from wrapping around each other while being laid in the ground. For a triplex electrical cable, it is desirable to maintain the three cables 301a, 301b and 301c in a triangular configuration as illustrated in FIG. 5A, FIG. 5B and FIG. 5C. The conduit guide 1 is capable of maintaining such a configuration by virtue of the valleys 25 and 45 of the upper contoured rollers 21, 41, which contain and constrain lateral motion of the upper cable 301a, by virtue of the lower flat rollers 22, 23, 42, 43 providing a support base for the lower two cables 301b, 301c, and by virtue of tapered inner surfaces 26 of the upper contoured rollers 21, 41, which constrain lateral motion of the lower two cables 301b, 301c. Pressure from the upper contoured rollers 21, 41 holds the three cables 301a, 301b and 301c in the triangular configuration.

To prevent damage to the conduit 301 by excessive abrasion against the rollers 21, 41, 22, 23, 42, 43, the roller sets 20, 40 are provided with roller gap adjusters 50 so that the spacings of the roller gaps 24, 44 are adjustable between fixed minimum spacings and fixed maximum spacings. The spacings of the roller gaps 24, 44 are dynamically adjustable for each of the roller sets 20, 40 by counter-pressure of the conduit 301 between the upper contoured rollers 21, 41 and the lower flat rollers 22, 23, 42, 43. There are four roller gap adjusters 50, two for each of the roller sets 20, 40. For each of the roller sets 20, 40, one of the roller gap adjusters 50 is mounted to the upper contoured roller 21 or 41 at one side of the upper contoured roller 21 or 41, and another of the roller gap adjusters 50 is mounted to the upper contoured roller 21 or 41 at the other side of the upper contoured roller 21 or 41. The two roller gap adjusters associated with one of the upper contoured rollers operate in tandem to adjust the roller gap of the roller set comprising that upper contoured roller. Because the roller gap adjusters 50 are all the same, the following description will refer to only one of the four roller gap adjusters 50.

Figure 2A:
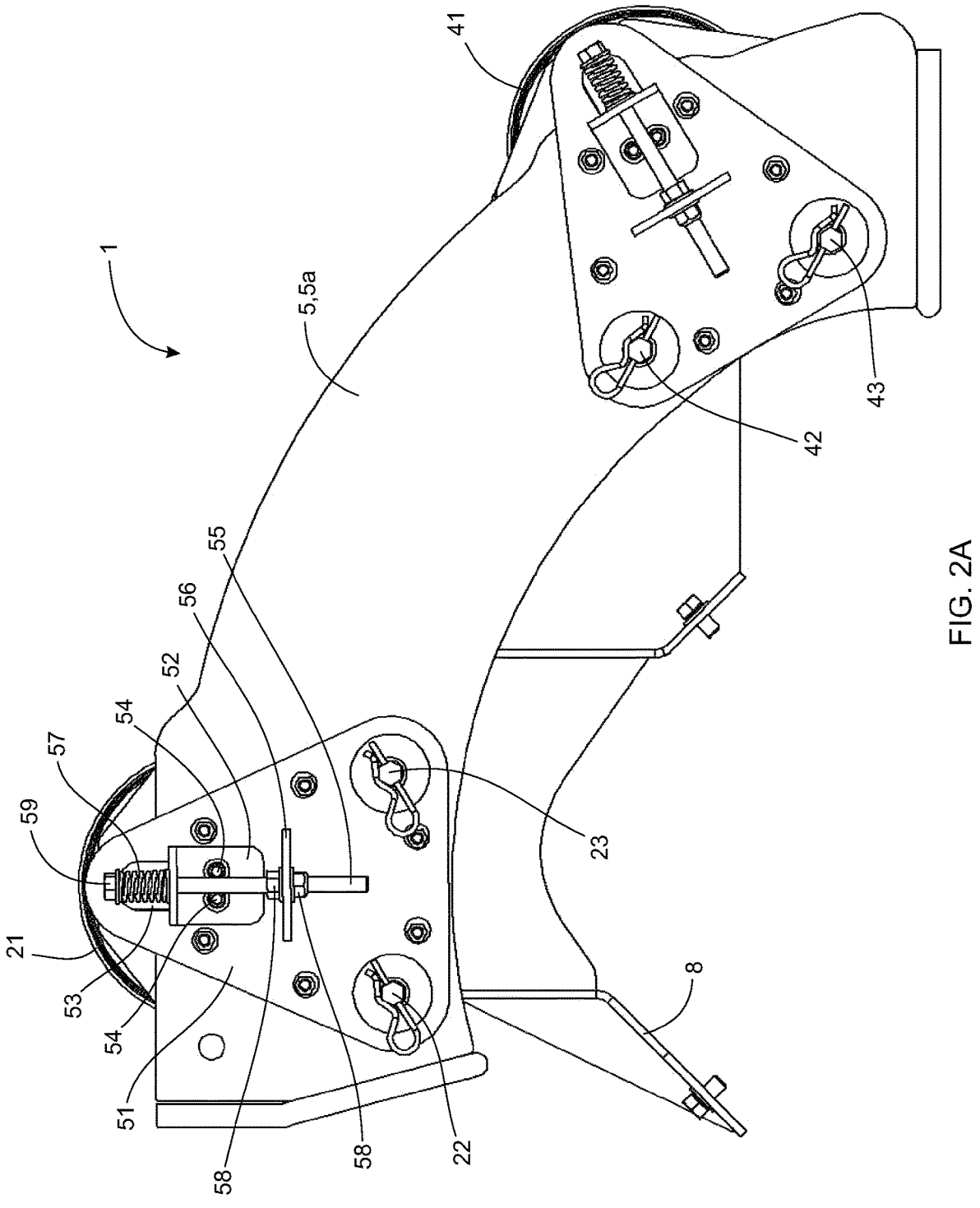
FIG. 2A depicts a side view of the conduit guide of FIG. 1A.
Figure 2B:
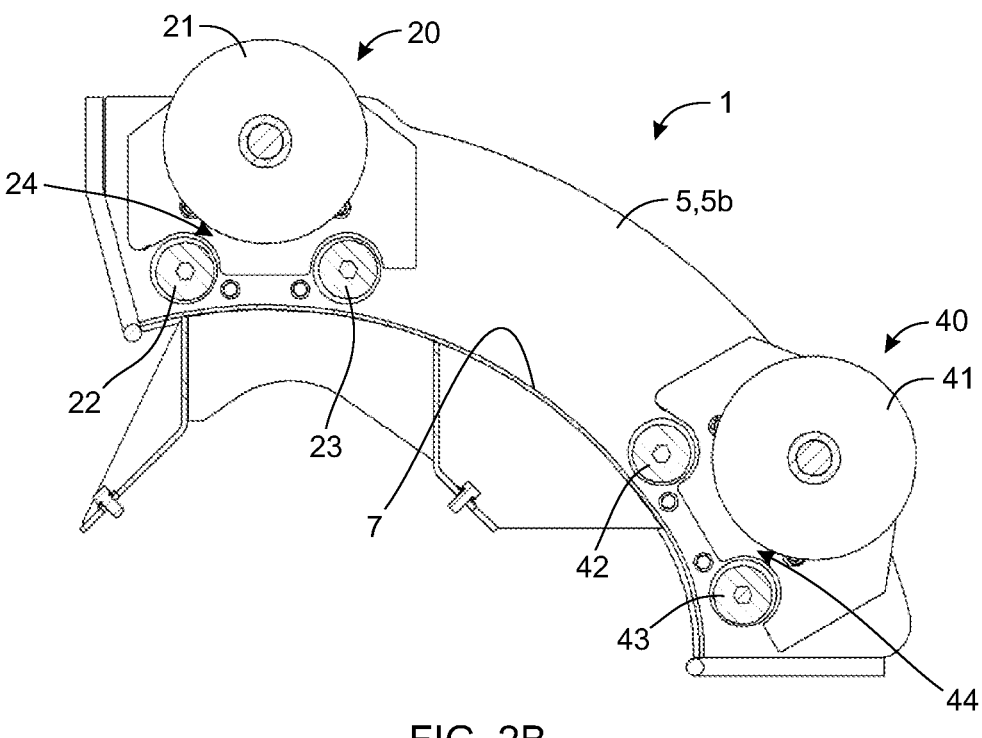
FIG. 2B depicts a side cross-sectional view of the conduit guide of FIG. 1A.
Figure 2C:
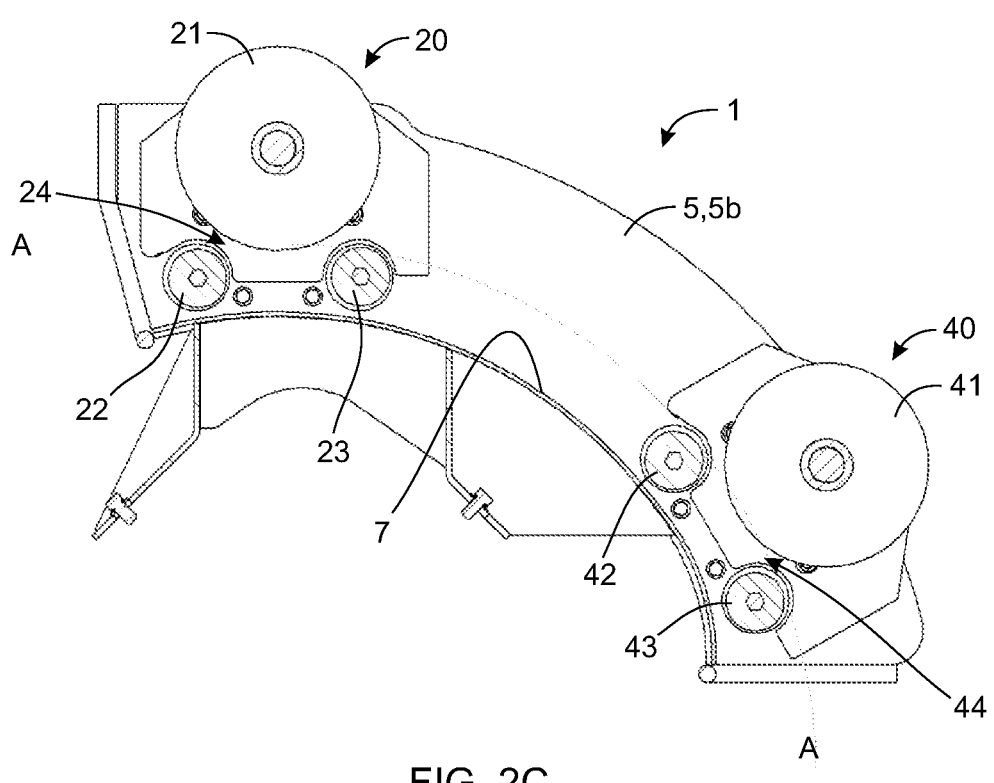
FIG. 2C depicts a side cross-sectional view of the conduit guide of FIG. 1A showing conduit path through the conduit guide.
Figure 4:
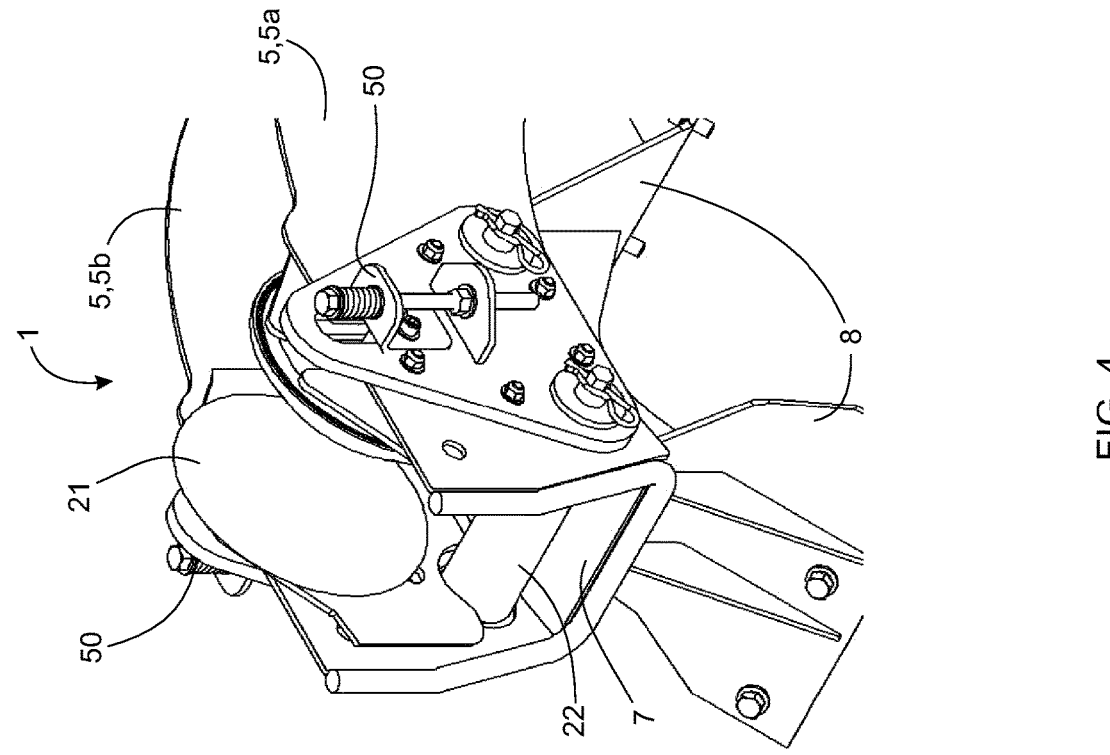
FIG. 4 depicts a magnified perspective view of a front of the conduit guide of FIG. 1A.
Figure 3:
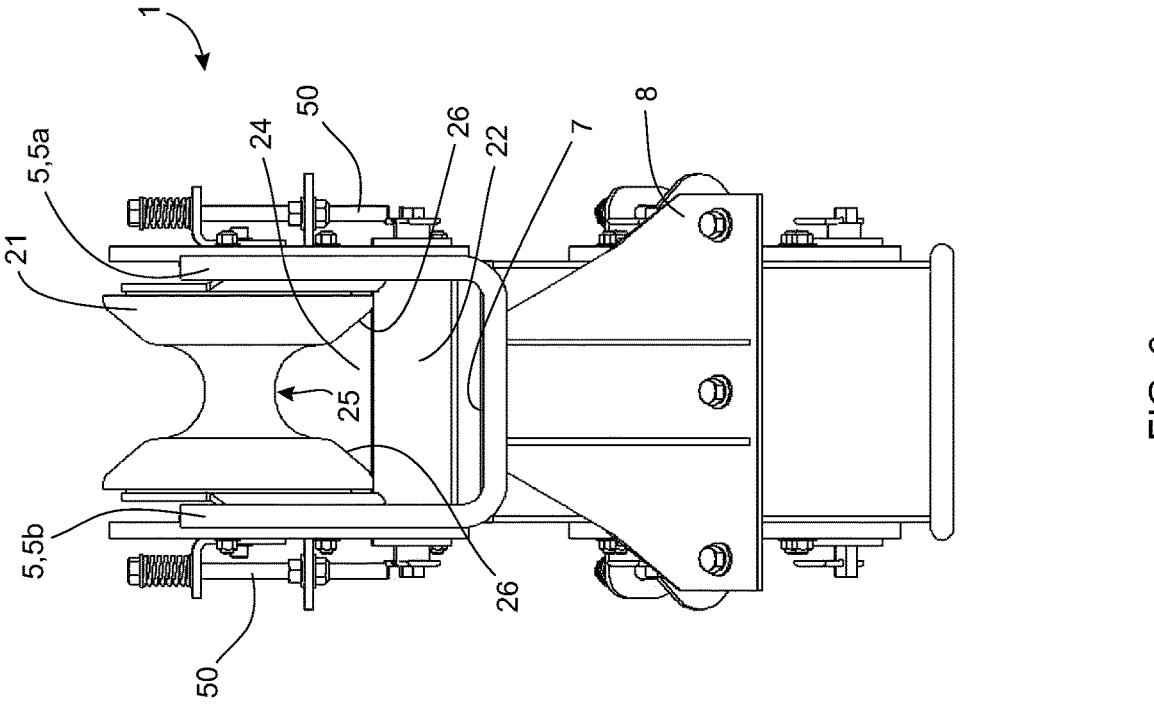
FIG. 3 depicts a front view of the conduit guide of FIG. 1A.

As best seen in FIG. 2A, the roller gap adjuster 50 comprises a mounting plate 51 mountable (for example with bolts, rivets or the like) to an outer surface of one of the walls of the conduit guide 1. A moveable L-shaped bracket 52 is fixedly connected to a non-rotatable portion of the upper contoured roller (21 or 41) through a slot 53 in the mounting plate 51 by one or more, in this case two, mounting pins 54. The moveable bracket 52 is equipped with a spring-loaded pin 55 (e.g., a spring-loaded bolt) fixedly but adjustably mounted to the mounting plate 51 through a pin bracket 56 having an aperture through which the spring-loaded pin 55 is inserted and then secured in place at a desired position by nuts 58. A spring 57 of the spring-loaded pin 55 is preferably a helical spring wrapped around the pin of the spring-loaded pin 55 but other types of biasing elements (e.g., leaf springs, pneumatic cylinders and the like) could be used instead. The spring 57 is situated and retained on the spring-loaded pin 55 so that the spring 57 is seated on the moveable bracket 52 between the moveable bracket 52 and a head 59 of the spring-loaded pin 55. The spring 57 is tensioned to bias the moveable bracket 52 to a bottom of the slot 53 where the bottom of the slot 53 prevents the mounting pins 54 from translating further. Because the upper contoured roller (21 or 41) is fixedly connected to the mounting pins 54, biasing of the moveable bracket 52 causes the upper contoured roller (21 or 41) to move toward the lower flat rollers (22, 23 or 42, 43) and the movement limit represented by the bottom of the slot 3 defines the fixed minimum spacing of the roller gap (24 or 44). Because the moveable bracket 52 is under a bias, the upper contoured roller (21 or 41) is also under a bias, which provides the pressure needed to hold the three cables 301a, 301b and 301c of the triplex electrical cable in the triangular configuration. However, while the spring 57 provides the bias to provide the pressure, the spring 57 is resilient. If there is sufficient counter-pressure from the conduit 301 on the upper contoured roller (21 or 41), the counter-pressure will cause the moveable bracket 52 to move against the bias of the spring 57 thereby permitting the upper contoured roller (21 or 41) to move away from the lower flat rollers (22, 23 or 42, 43) increasing the spacing of the roller gap (24 or 44) up to a fixed maximum spacing of the roller gap (24 or 44) defined by the top of the slot 53. Thus, the roller gap adjuster 50 permits dynamic adjustment of the spacing of the roller gap (24 or 44) to prevent abrasion damage to the conduit 301 while continuously biasing the upper contoured roller (21 or 41) toward the lower flat rollers (22, 23 or 42, 43) to maintain the correct configuration for a multiplexed conduit.

The position of the spring-loaded pin 55 is set for a certain conduit diameter in order to provide an optimum biasing force on the conduit 301 at the fixed minimum spacing of the roller gap (24 or 44) to be able to maintain the correct conduit configuration while not causing abrasion damage to conduit 301 as the conduit 301 passes through the roller gap (24 or 44). As seen in FIG. 5A to FIG. 5C, the conduit guide 1 can accommodate conduits of different diameters, while being able to maintain a desired conduit configuration. For example, the cables 301a, 301b and 301c in FIG. 5A are smaller in diameter than in FIG. 5B, which are smaller in diameter than in FIG. 5C. In order to maintain the optimum biasing force on the conduit 301 at the fixed minimum spacing of the roller gap (24 or 44), when the diameter of the conduit 301 changes, the position of the spring-loaded pin 55 should change. Changing the position of the spring-loaded pin 55 is accomplished by loosening the nuts 58, moving the spring-loaded pin 55 up or down, and then re-tightening the nuts 58.

Figure 6A:
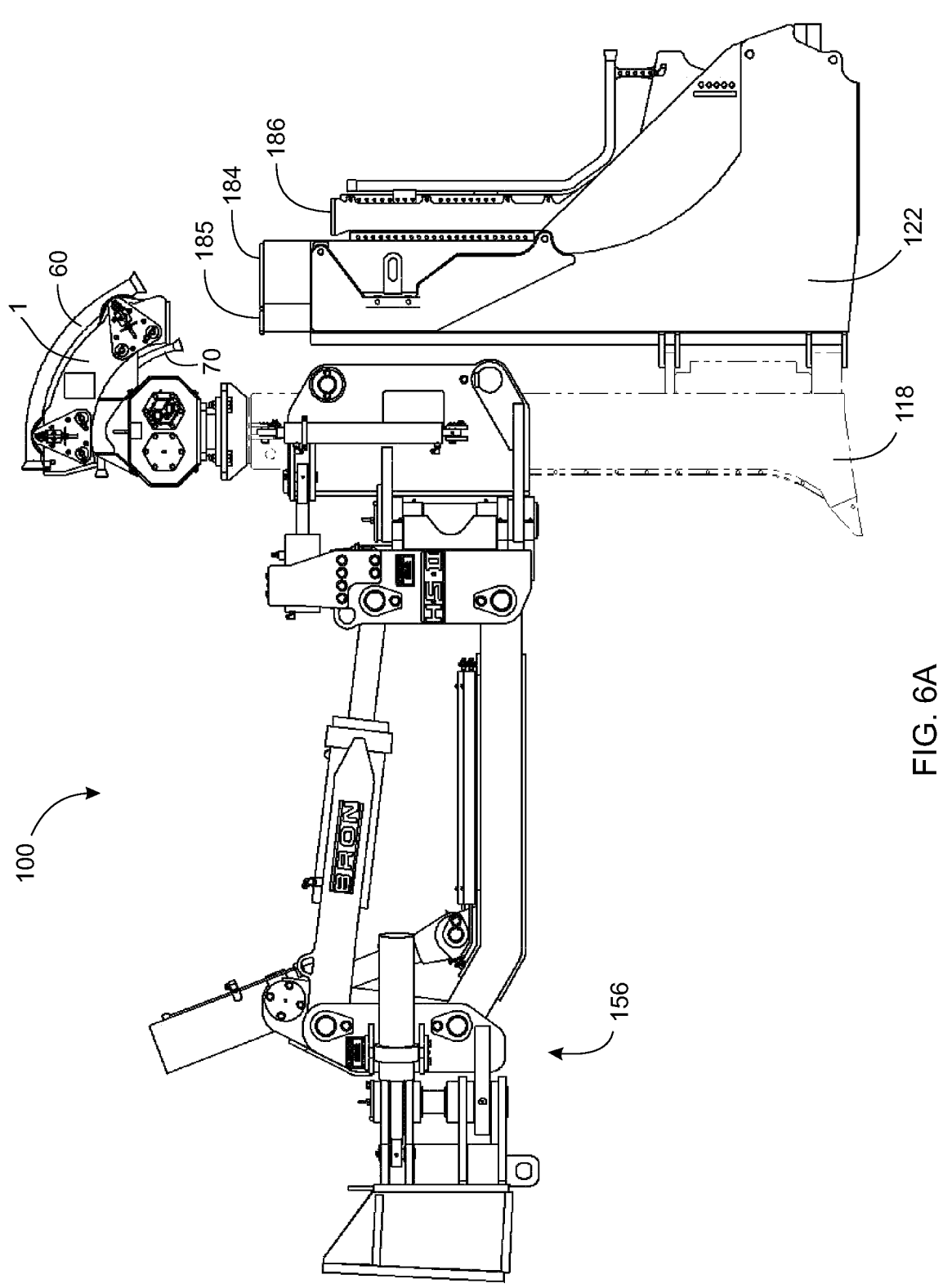
FIG. 6A depicts a side view of a cable plow with the conduit guide of FIG. 1A mounted thereon.
Figures 6B, 6C:
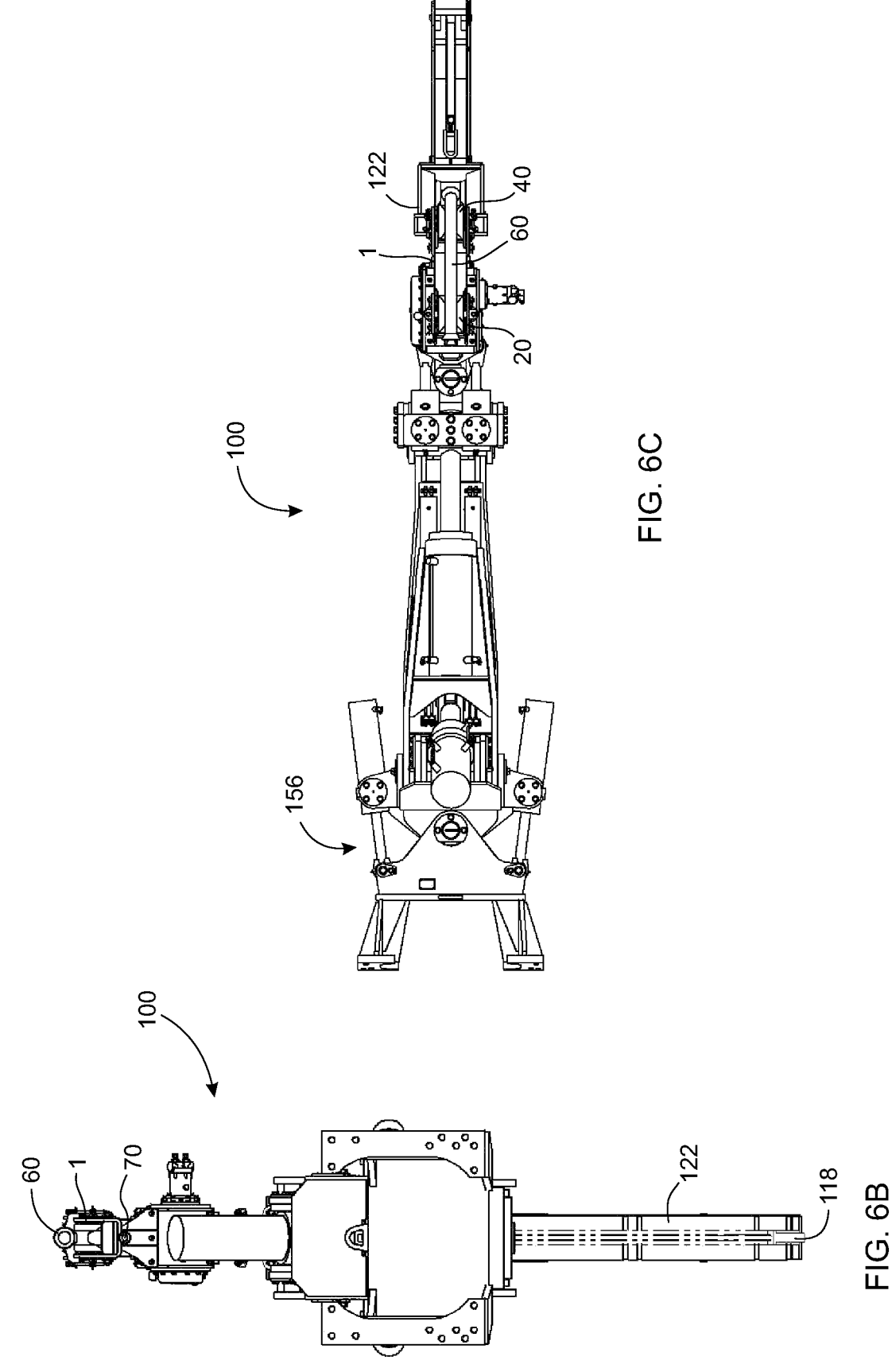
FIG. 6B depicts a front view of the cable plow of FIG. 6A.
FIG. 6C depicts a top view of the cable plow of FIG. 6A.
Figure 8A:
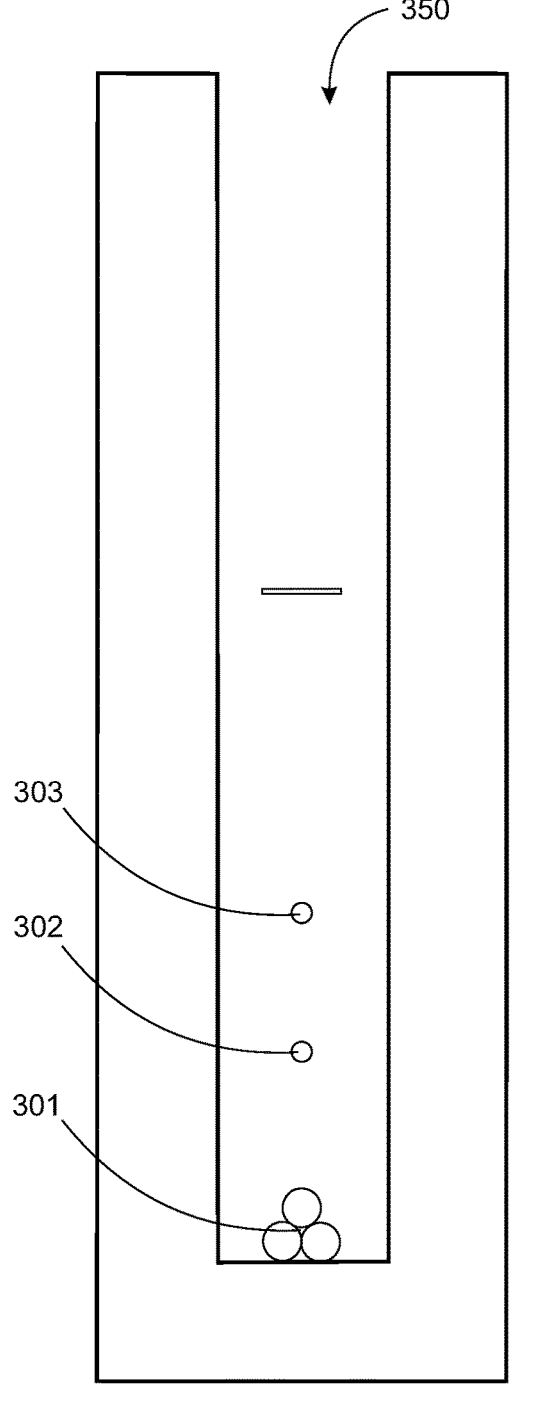
FIG. 8A depicts a conduit trench showing a first arrangement of conduits that can be laid in the trench by the machine of FIG. 7A.
Figure 8B:
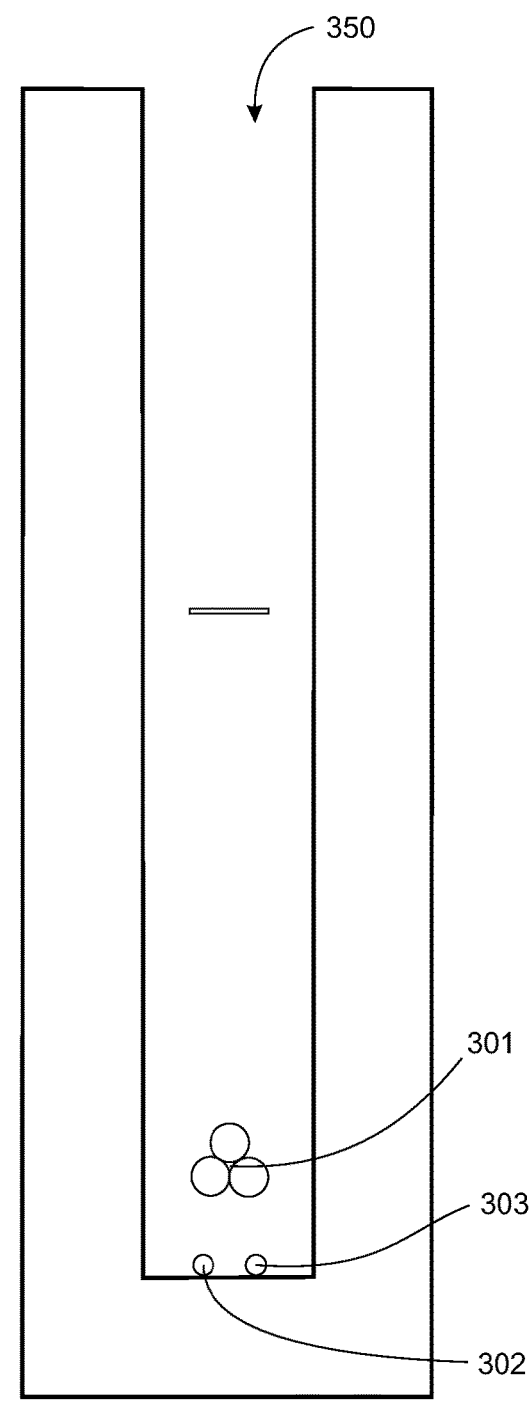
FIG. 8B depicts a conduit trench showing a second arrangement of conduits that can be laid in the trench by the machine of FIG. 7A.

As seen in FIG. 6A to FIG. 6C, the conduit guide 1 is mounted on the cable plow 100 at a top of the cable plow 100 in order to received the conduit 301 being drawn overhead from the front. The cable plow 100 further comprises a trench former 118 connected at a front thereof to a hitching system 156 and at a rear thereof to a conduit feed system 122. The conduit feed system 122 comprises one or more conduit feed passages, for example the conduit feed passage 184 that receives the conduit 301 from the conduit guide 1. The conduit guide 1 may comprise additional arcuate channels 60, 70 in the form of arcuate pipes (see FIG. 6A) for laying additional conduits, for example tape, fiber optic cable and the like. The additional arcuate channels 60, 70 guide their respective conduits to separate conduit feed passages 185, 186. In this way, as seen in FIG. 8A and FIG. 8B, a plurality of different conduit types 301, 302, 303 can be laid in a trench 350 in different arrangements.

Figure 7A:
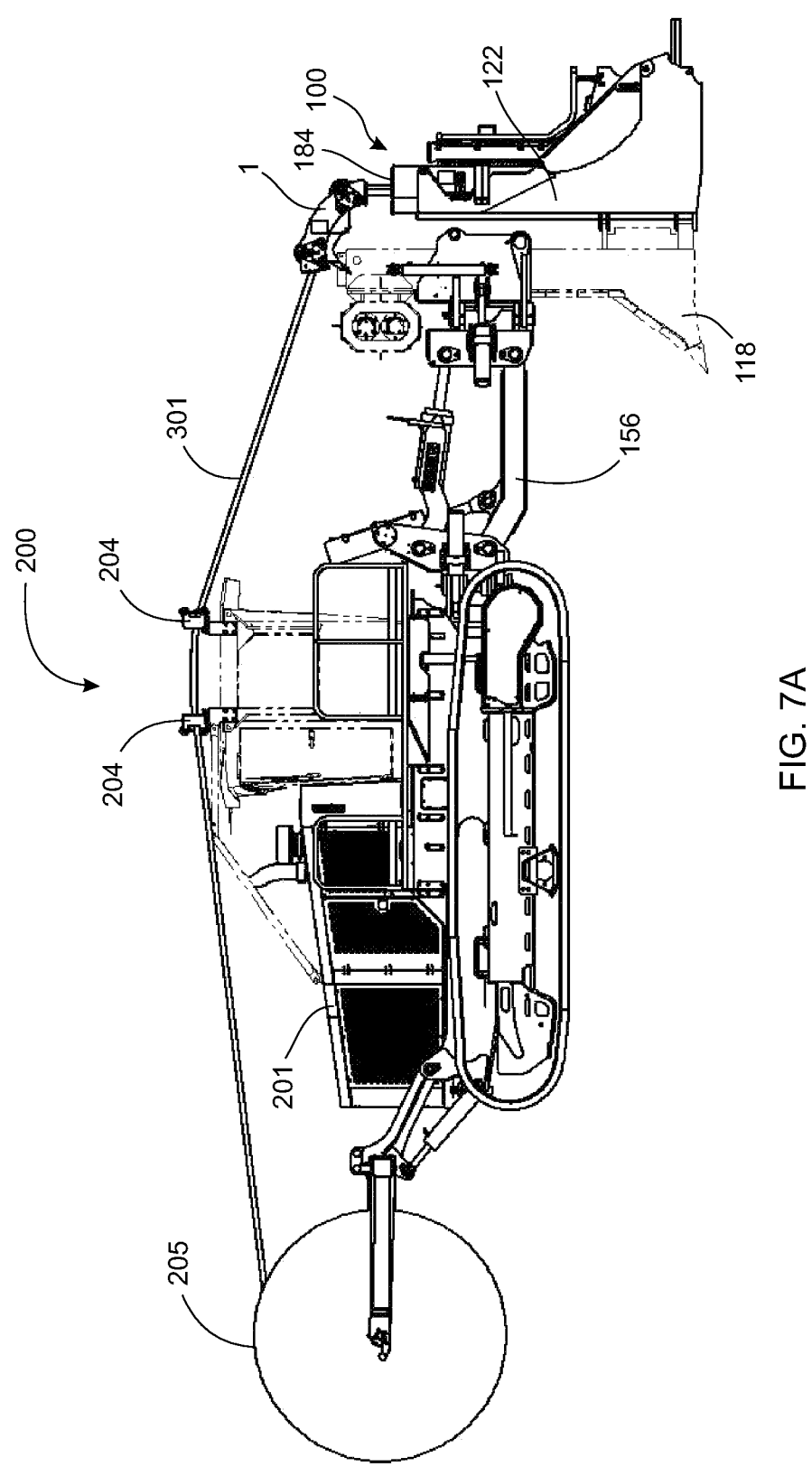
FIG. 7A depicts a side view of a conduit laying machine in which cable reels and the cable plow of FIG. 6A are mounted on a tractor.
Figure 7B:
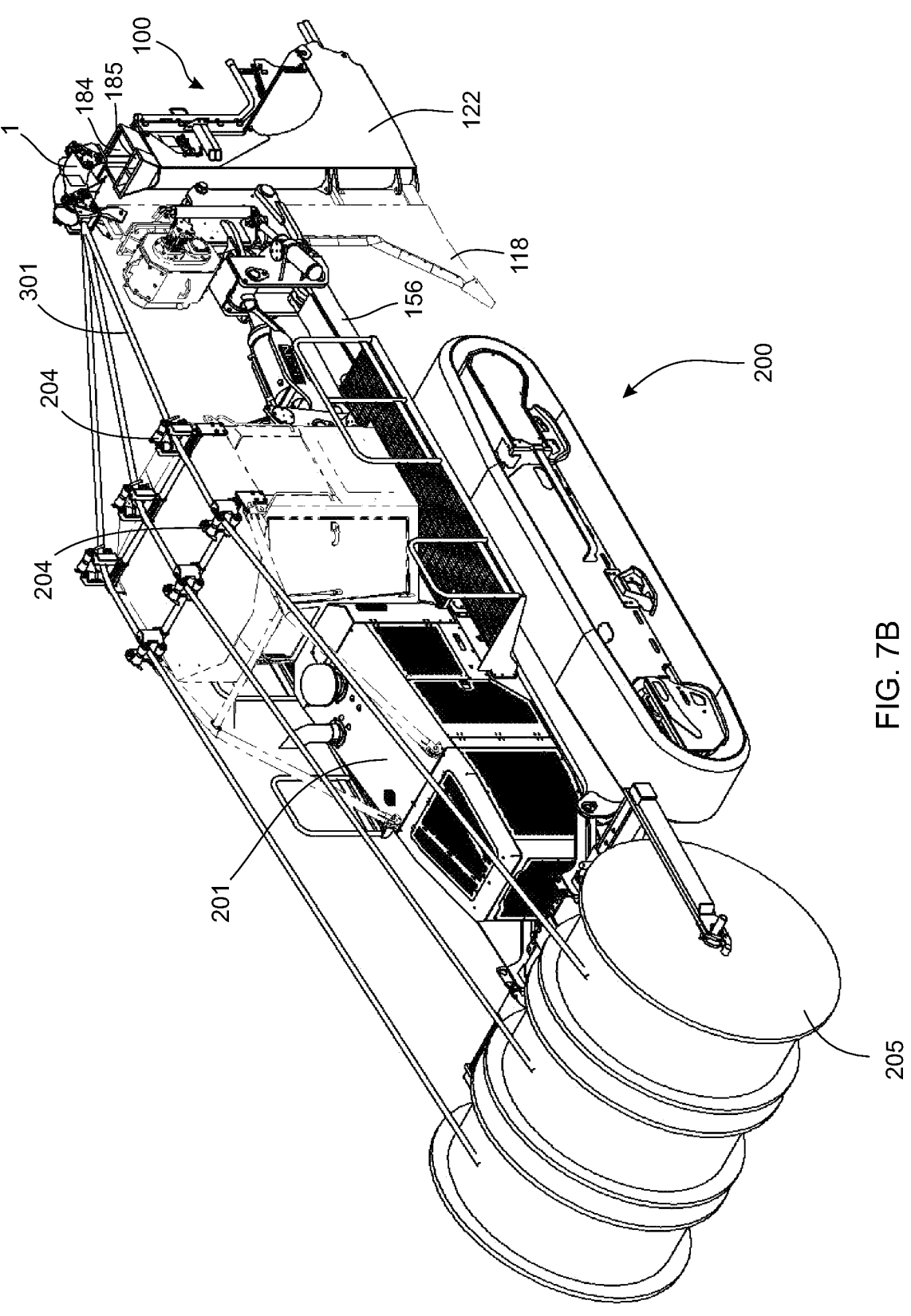
FIG. 7B depicts a perspective view of the conduit laying machine of FIG. 7A.

As seen in FIG. 7A and FIG. 7B, the conduit laying machine 200 comprises a vehicle 201, for example a tractor or a truck, to which the cable plow 100 is hitched at a rear of the vehicle 201 through the hitching system 156. Supported at a front of the vehicle 201 is at least one conduit reel 205, preferably at least three conduit reels as shown in FIG. 7B. As many conduit reels as needed may be supported on the vehicle 201. Conduit 301 is drawn from the at least one conduit reel 205 across and above a top of the vehicle 201 to the conduit guide 1. The conduit may be supported above the vehicle 201 by one or more fairleads 204. In operating the conduit laying machine 200 to lay the conduit 301 in the trench 350, the trench former 118 of the cable plow 100 is lowered into the ground and the vehicle 201 drives forward so that the trench former 118 can form the trench 350. As the vehicle 201 drives forward and the trench 350 is formed, the conduit 301 is drawn from the at least one conduit reel 205 by the conduit feed system 122. Drawn conduit is guided by the conduit guide 1 into the conduit feed passage 184, which continuously feeds the conduit 301 into the trench 350. The conduit laying machine 200 may further comprises other usual features such as hoppers for base material and base material passages for feeding the base material into the trench 350 in order to close the trench 350 over the laid conduit 301.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A conduit laying machine comprising:
   a vehicle;
   at least one conduit reel mounted on the vehicle; and,
   a cable plow mounted on the vehicle, the cable plow comprising a conduit guide for guiding conduit from the at least one conduit reel into a conduit feed passage of the cable plow, the conduit guide comprising:

laterally spaced apart walls defining an arcuate channel through which the conduit passes;
at least two longitudinally spaced apart roller sets rotatably mounted in the channel, the at least two longitudinally spaced apart roller sets comprising a front roller set and a rear roller set, wherein
   the front roller set comprises a first upper bow roller and at least two longitudinally spaced apart first lower flat rollers with the first upper bow roller situated between two of the first lower flat rollers, the conduit passing through a first roller gap between the first upper and lower rollers, and
   the rear roller set comprises a second upper bow roller and at least two longitudinally spaced apart second lower flat rollers with the second upper bow roller situated between two of the second lower flat rollers, the conduit passing through a second roller gap between the second upper and lower rollers;
   wherein the conduit follows an arcuate path between the first and second roller gaps, the arcuate path having a radius that is equal to or greater than a minimum bend radius for the conduit;
at least one roller gap adjuster, the at least one roller gap adjuster operable to adjust spacings of the roller gaps, the at least one roller gap adjuster comprising at least one resilient biasing element that permits increasing the spacing of the roller gaps while biasing the spacings of the roller gaps toward fixed minimum spacings of the roller gaps.

2. The machine of claim 1, wherein the conduit is triplex electrical cable.

3. The machine of claim 2, wherein the at least one conduit reel comprises at least three conduit reels, one conduit reel for each cable of the triplex electrical cable.

4. The machine of claim 1, wherein the at least two longitudinally spaced apart roller sets comprises two longitudinally spaced apart roller sets, wherein the front roller set is situated vertically higher than the rear roller set in the arcuate channel when the conduit guide is mounted on the conduit laying machine.

5. The machine of claim 1, wherein the at least one roller gap adjuster comprises at least one moveable bracket connected to one or all of the upper bow rollers, and wherein the at least one resilient biasing element comprises at least one spring-loaded pin fixedly mounted to at least one of the walls and mounted on the at least one moveable bracket under tension to bias the at least one moveable bracket toward the fixed minimum spacings of the roller gaps while permitting the at least one moveable bracket to move under forces applied by the conduit as the conduit passes through the roller gaps in order to increase the spacing of the roller gap.

6. The machine of claim 1, wherein the at least one resilient biasing element is adjustable to adjust biasing tension of the at least one resilient biasing element.

7. The machine of claim 1, wherein the conduit guide comprises two roller sets and four roller gap adjusters, with one roller gap adjuster connected to each side of each upper bow roller.

8. The machine of claim 1, wherein the conduit guide further comprises one or more additional arcuate channels for guiding one or more additional conduits into one or more additional conduit feed passages.

9. A cable plow comprising:
   a trench former;
   a conduit feed passage mounted behind the trench former; and, a conduit guide mounted above the conduit feed passage for guiding conduit into the conduit feed passage, the conduit guide comprising:

laterally spaced apart walls defining an arcuate channel through which the conduit passes;

at least two longitudinally spaced apart roller sets rotatably mounted in the channel, the at least two longitudinally spaced apart roller sets comprising a front roller set and a rear roller set, wherein the front roller set comprises a first upper bow roller and at least two longitudinally spaced apart first lower flat rollers with the first upper bow roller situated between two of the first lower flat rollers, the conduit passing through a first roller gap between the first upper and lower rollers, and the rear roller set comprises a second upper bow roller and at least two longitudinally spaced apart second lower flat rollers with the second upper bow roller situated between two of the second lower flat rollers, the conduit passing through a second roller gap between the second upper and lower rollers;

wherein the conduit follows an arcuate path between the first and second roller gaps, the arcuate path having a radius that is equal to or greater than a minimum bend radius for the conduit;

at least one roller gap adjuster, the at least one roller gap adjuster operable to adjust spacings of the roller gaps, the at least one roller gap adjuster comprising at least one resilient biasing element that permits increasing the spacings of the roller gaps while biasing the spacings of the roller gaps toward fixed minimum spacings of the roller gaps.

10. The cable plow of claim 9, wherein the conduit is triplex electrical cable.

11. The cable plow of claim 10, wherein the at least one conduit reel comprises at least three conduit reels, one conduit reel for each cable of the triplex electrical cable.

12. The cable plow of claim 9, wherein the at least two longitudinally spaced apart roller sets comprises two longitudinally spaced apart roller sets, wherein the front roller set is situated vertically higher than the rear roller set in the arcuate channel when the conduit guide is mounted on the conduit laying machine.

13. The cable plow of claim 9, wherein the at least one roller gap adjuster comprises at least one moveable bracket connected to one or all of the upper bow rollers, and wherein the at least one resilient biasing element comprises at least one spring-loaded pin fixedly mounted to at least one of the walls and mounted on the at least one moveable bracket under tension to bias the at least one moveable bracket toward the fixed minimum spacings of the roller gaps while permitting the at least one moveable bracket to move under forces applied by the conduit as the conduit passes through the roller gaps in order to increase the spacing of the roller gap.

14. The cable plow of claim 9, wherein the at least one resilient biasing element is adjustable to adjust biasing tension of the at least one resilient biasing element.

15. The cable plow of claim 9, wherein the conduit guide comprises two roller sets and four roller gap adjusters, with one roller gap adjuster connected to each side of each upper bow roller.

16. The cable plow of claim 9, wherein the conduit guide further comprises one or more additional arcuate channels for guiding one or more additional conduits into one or more additional conduit feed passages.

17. A conduit guide for a conduit laying machine, the conduit guide comprising:

laterally spaced apart walls defining an arcuate channel through which conduit passes;

at least two longitudinally spaced apart roller sets rotatably mounted in the channel, the at least two longitudinally spaced apart roller sets comprising a front roller set and a rear roller set, wherein the front roller set comprises a first upper bow roller and at least two longitudinally spaced apart first lower flat rollers with the first upper bow roller situated between two of the first lower flat rollers, the conduit passing through a first roller gap between the first upper and lower rollers, and the rear roller set comprises a second upper bow roller and at least two longitudinally spaced apart second lower flat rollers with the second upper bow roller situated between two of the second lower flat rollers, the conduit passing through a second roller gap between the second upper and lower rollers;

wherein the conduit follows an arcuate path between the first and second roller gaps, the arcuate path having a radius that is equal to or greater than a minimum bend radius for the conduit;

at least one roller gap adjuster, the at least one roller gap adjuster operable to adjust spacings of the roller gaps, the at least one roller gap adjuster comprising at least one resilient biasing element that permits increasing the spacings of the roller gaps while biasing the spacings of the roller gaps toward fixed minimum spacings of the roller gaps.

18. The conduit guide of claim 17, wherein the at least two longitudinally spaced apart roller sets comprises two longitudinally spaced apart roller sets, wherein the front roller set is situated vertically higher than the rear roller set in the arcuate channel when the conduit guide is mounted on the conduit laying machine.

19. The conduit guide of claim 17, wherein the at least one roller gap adjuster comprises at least one moveable bracket connected to one or all of the upper bow rollers, and wherein the at least one resilient biasing element comprises at least one spring-loaded pin fixedly mounted to at least one of the walls and mounted on the at least one moveable bracket under tension to bias the at least one moveable bracket toward the fixed minimum spacings of the roller gaps while permitting the at least one moveable bracket to move under forces applied by the conduit as the conduit passes through the roller gaps in order to increase the spacing of the roller gap.

20. The conduit guide of claim 17, wherein the at least one resilient biasing element is adjustable to adjust biasing tension of the at least one resilient biasing element.

21. The conduit guide of claim 17, wherein the conduit guide comprises two roller sets and four roller gap adjusters, with one roller gap adjuster connected to each side of each upper bow roller.

22. The conduit guide of claim 17, wherein the conduit guide further comprises one or more additional arcuate channels for guiding one or more additional conduits into one or more additional conduit feed passages.

* * * * *